INVENTOR.
PERCIVAL H. SHERRON
BY
Busser, Smith & Harding
ATTORNEYS

INVENTOR.
PERCIVAL H. SHERRON
BY
Busser, Smith & Harding
ATTORNEYS

United States Patent Office 3,132,578

Patented May 12, 1964

3,132,578

TELEPHONE BOOTH CEILING STRUCTURE INCLUDING AIR CIRCULATING MEANS

Percival H. Sherron, Jamaica, N.Y. (% Sherron Metallic Corporation, 1201 Flushing Ave., Brooklyn 37, N.Y.)

Filed Nov. 21, 1961, Ser. No. 153,961
4 Claims. (Cl. 98—39)

This invention relates to ceiling structures for telephone booths.

It is common practice to provide telephone booth ceiling structures which comprise a ceiling chamber having mounted therein means for illuminating the telephone booth and means for ventilating the telephone booth. It is the general object of this invention to provide a telephone booth ceiling structure of this type having an improved construction and arrangement of parts so as to provide good illumination and ventilation of the telephone booth as well as easy access to the ceiling chamber. Proper lighting and ventilation, of course, contribute to the general comfort of those using the telephone booth. The construction of the ceiling structure so as to permit easy access to the ceiling chamber aids the installation of electrical equipment and wiring for the illumination and ventilating means. These features of good illumination and ventilation and easy access to the ceiling chamber are essential requirements for the construction of a satisfactory telephone booth ceiling structure.

The above and other objects and features of this invention will become apparent from a consideration of the following description read in conjunction with the accompanying drawings, in which.

Figure 2:
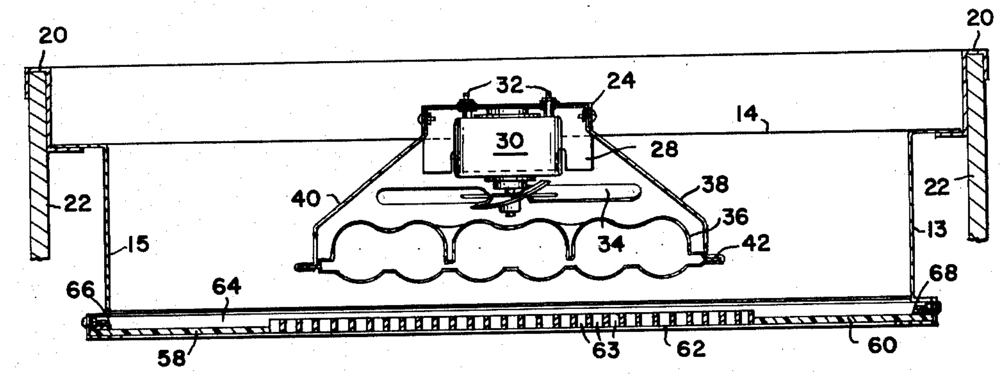
FIGURE 2 is a sectional view taken on line 2—2 of FIGURE 1.
Figure 3:
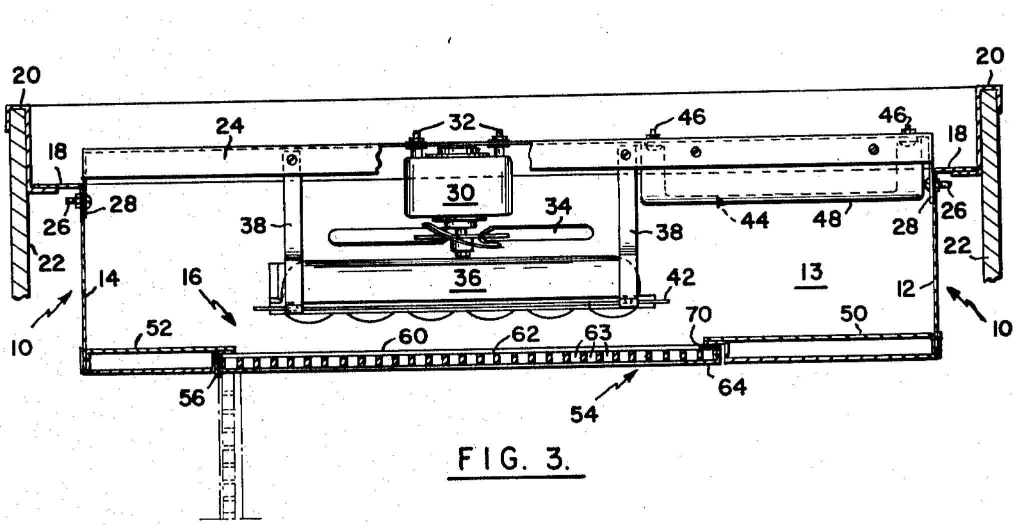
FIGURE 3 is a sectional view taken on line 3—3 of FIGURE 1.
Figure 1:
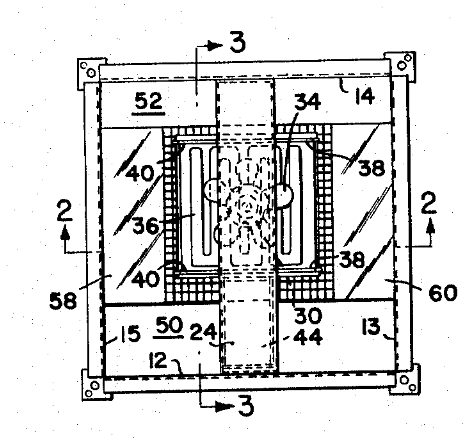
FIGURE 1 is a plan view of the ceiling structure in accordance with this invention with the top cover removed.

The telephone booth ceiling structure shown in FIGURES 1 to 3 comprises a rectangular housing 10 which includes four sides 12, 13, 14 and 15 and a bottom indicated generally at 16 which serves as the ceiling for the telephone booth. Sides 12 and 14 extend respectively across the front and rear of the telephone booth. The sides have outwardly extending flanges 18 adapted to rest on horizontally extending flanges formed on the inner legs of channel members 20. Channel members 20 are adapted to be supported by the side panels 22 of the telephone booth as shown in FIGURE 3. The telephone booth cover (not shown) rests on the upper portion of channel members 20. The housing 10 is supported on the telephone booth structure by means of the flanges 18, the supporting arrangement being more fully described in my Patent No. 2,896,694, issued November 1, 1960.

A channel member 24 is attached to the front and rear sides 12 and 14 of the housing 10 by means of suitable screws which cooperate with downwardly turned flanges 28 at the ends of member 24 and the corresponding front and rear sides 12 and 14. The member 24 is thus supported by the sides of the ceiling structure and extends transversely of the telephone booth from front to back.

The ventilating means comprises a fan motor 30 which is mounted on the member 24 by suitable mounting screws

32 and is adapted to drive the fan blades 34 which are fixedly mounted on the lower end of the motor shaft extending downwardly from the motor 30. Screws 32 cooperate with suitable nuts and washers to mount the motor 30 in a well known manner.

The illuminating means in accordance with this invention comprises a square panel 36 of fluorescent lighting means. By way of example, the lamp panel 36 may comprise a twelve inch square fluorescent lamp known in the trade as the General Electric twelve inch square panel fluorescent lamp No. F.P. 12S/CW. In view of its shape this lamp may be regarded as a lighting panel. Panel 36 is relatively thin compared to previous telephone booth lighting means and provides a very effective source of light by reason of the large source area. Also, this fluorescent panel provides uniform light distribution. The illuminating means is supported on the channel member 24 by means of two pairs of brackets 38 and 40. The upper ends of brackets 38 and 40 are secured to member 24, as by mounting screws. The lower ends of brackets 38 and 40 are bent outwardly and back to embrace a peripheral flange 42 projecting from the lighting panel 36 as is best shown in FIGURE 2. The brackets 38 and 40 are flexible so that panel 36 may be easily installed and removed by movement of the brackets outwardly from their normal position shown in the drawings. The lighting panel 36 is positioned by the brackets 38 and 40 directly beneath the fan. The usual electrical ballast means, indicated generally at 44, for controlling the illuminating means are supported on member 24 by suitable mounting screws 46. A cover 48 is provided to enclose the ballast means 44 which includes the usual electrical devices for operating the lighting means, such as ballast transformers, starters, and appropriate connections to a source of electrical energy.

The ceiling 16 comprises a front panel 50 and a rear panel 52 extending horizontally between the lower edges of the side walls 13 and 15 of housing 10. These panels extend transversely of the telephone booth as viewed from the front thereof as shown in FIGURE 1. A hinged light-transmitting ceiling panel 54 is positioned between these front and rear panels. The hinge is indicated at 56 and has one leg connected to the rear panel 52 and the other leg connected to the frame of the panel 54 by suitable means such as welding or mounting screws.

The panel 54 is comprised of a pair of side sections 58 and 60 and a substantially square central section 62. The side sections are preferably formed of a translucent plastic material which has substantial resistance to breakage such as, for example, "Plexiglas." The central section 62 is provided with a plurality of rectangular openings 63 to provide passageways for the flow of air between the telephone booth and the ceiling chamber. The central section 62 thus presents an "egg crate" or checkerboard appearance. As is shown in FIGURE 1, the central section 62 is in alignment with the lighting panel and the fan and is of slightly larger size than the lighting panel.

The sections of the hinged panel 54 are secured together and supported by a frame comprising a border 64 around the edges of the panel 54. The border 64 is L-shaped in cross-section, as shown in FIGURES 2 and 3, with one leg thereof extending longitudinally of the panel 54 so as to support the marginal areas of the panel 54. A pair of angular retaining members 66 and 68 are attached, by suitable means such as screws, to the border legs which extend transversely of the ceiling panel sections. The retaining members 66 and 68 have legs extending in opposed relation to the longitudinally extending legs of the border 64 and contact the upper portion of the side sections 58 and 60 at marginal areas thereof for retaining the same. An angular retaining member 70 (FIGURE 3) is attached, as by welding, to the transversely extending leg of the border 64, extends along the unhinged edge of the panel 54 and is adapted to retain this edge in fixed relation relative to the border 64. The border 64 and retaining members 66, 68 and 70 conjointly form a frame for the hinged ceiling panel 54 and retain the sections 58, 60 and 62 in flat edge-to-edge relation to form a unitary panel structure.

The front and rear panel members 50 and 52 forming the booth ceiling in conjunction with panel 54 are comprised of spaced upper and lower members. The lower member is bent upwardly to meet the upper member and then outwardly in contact therewith to form a recess and an overlying lip or ledge which extends over the periphery of the panel 54 when this panel is in the closed position. The ceiling panel 54 is received in this recess, as shown in FIGURE 3, whereby a smooth ceiling 16 is provided. The ceiling panel 54 may be retained in the closed position by any suitable means, such as screw members or latches.

One or more of the sides 12, 13, 14 and 15 of the ceiling structure is provided with a suitable screened opening communicating with louvers in the side wall of the booth as is well known to provide circulation passages between the ceiling chamber and the exterior of the telephone booth. An example of this well known construction is the structure disclosed in my Patent No. 2,958,402. The fan motor 30 may be controlled by conventional circuitry which is well known in the art.

Figure 5:
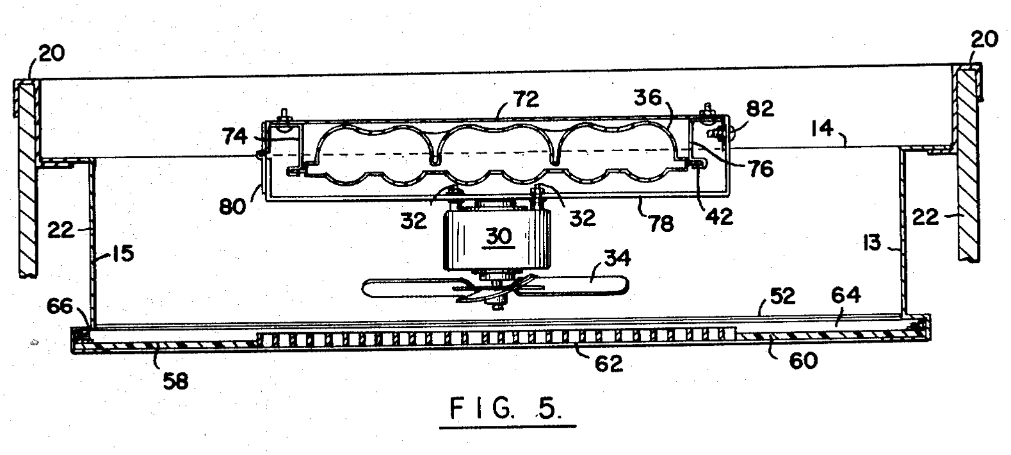
FIGURE 5 is a sectional view taken on line 5—5 of FIGURE 4.
Figure 6:
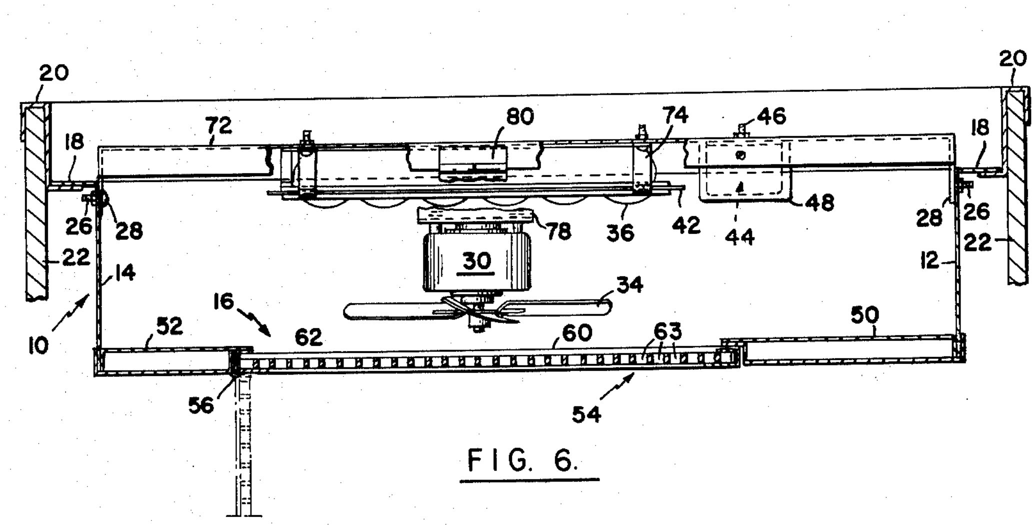
FIGURE 6 is a sectional view taken on line 6—6 of FIGURE 4.
Figure 4:
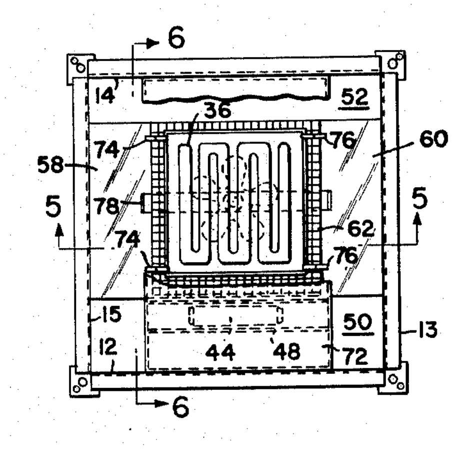
FIGURE 4 is a plan view of another form of ceiling structure in accordance with this invention with the top cover removed.

A second form of the invention is shown in FIGURES 4 to 6, this form being similar in many respects to the form of the invention previously described. Accordingly, the parts corresponding to parts hereinbefore described are given like reference numerals. The essential difference of this second form over the form previously described is that the fan motor and blades are positioned beneath the lighting panel and immediately above the central section of the hinged ceiling panel. This provides better air circulation through the telephone booth.

The ceiling structure is supported on the side panels of the telephone booth as was previously described. The ceiling 16 is also identical with the ceiling previously described. A channel member 72 similar to but wider than channel member 24 is attached to the front and rear sides 12 and 14 of the housing 10 in a manner similar to the channel member 24.

The square panel 36 of fluorescent lighting means is supported on the channel member 72 by means of two pairs of brackets 74 and 76. The upper end of the brackets 74 and 76 are secured to channel member 72, as by mounting screws. The lower ends of the brackets 74 and 76 are bent to embrace a peripheral flange 42 projecting from the lighting panel. The lighting panel 36 is positioned by the channel 72 and brackets 74 and 76 approximately centrally of the telephone booth. The brackets are flexible to permit easy installation of lighting panel 36.

The ventilating means comprises a fan motor 30 and fan blades 34. A motor mounting bracket 78 is secured to one leg of a hinge 80 at one end, the other leg of the hinge 80 being secured to one of the side legs of channel 72. The other end of the motor mounting bracket 78 is secured by mounting screw 82 to the opposite side leg of channel 72. The motor mounting bracket 78 thus presents a horizontally extending supporting means for the motor 30 which is secured to this bracket by the mounting screws 32, washers and nuts as is well known. The ventilating means is positioned immediately above the "egg crate" central section 62 of the hinged ceiling panel 54. By reason of this proximate location, very effective ventilating may be accomplished.

It will be noted that the lighting and ventilating unit described above permits replacement of the lighting panel 36 without any disassembly of the ventilating means from the support thereof. Thus, the lighting means 36 may be replaced by removing the screw 82 to thereby release the bracket 78 which may then be swung downwardly about the hinge 80 to provide the clearance needed for the replacement of the lighting means 36. After the lighting means is replaced, the bracket 78 along with the fan motor and blades is swung upwardly about hinge 80 and the screw 82 is screwed into the side leg of channel member 72 as shown in FIGURE 5.

The electrical ballast means 44 for controlling the illuminating means is supported on the channel 72 by the bolts 46 as is best shown in FIGURE 6. The cover 48 is provided to enclose the ballast means 44.

The ventilating means is preferably operated to provide an updraft of air from the interior of the telephone booth through the egg crate section 64 and the ceiling chamber from which the air is delivered to the exterior of the booth through suitable discharge openings (not shown).

It will be apparent that in the two forms of the invention previously described, the ceiling panel arrangement will permit easy access to the ceiling chamber by moving the same to the open position as shown in dotted lines in FIGURES 3 and 6. Also, there will be achieved effective ventilation of the telephone booth by the air circulation which is provided by the fan. Moreover, by reason of the use of the light panel 36, a very high quality of illumination of the telephone booth is achieved. The square lighting panel 36 provides a large and uniform source of light.

It will be evident that various modifications in the construction and arrangement of parts may be made in the structure embodying the invention as disclosed herein without departing from the scope of the invention as set forth in the following claims.

What is claimed is:

1. In a ceiling structure for a telephone booth, the combination comprising a housing adapted to be mounted on the top of the telephone booth, said housing including a horizontally extending panel means having a light transmitting panel and adapted to provide a ceiling for the telephone booth, said light transmitting panel having a portion providing passageways for the passage of air and light through said ceiling panel means, and upright side walls for supporting said ceiling panel means, illuminating means including a light producing panel providing a planar source of light, air circulating means, and means securing said illuminating means and said air circulating means together to form an illumination and ventilating unit with said illuminating means positioned beneath said air circulating means and mounting said unit on said upright side walls at a location substantially centrally of the telephone booth above said ceiling panel means with said light producing panel extending horizontally, said light transmitting panel being located in alignment with and immediately beneath said illuminating means, said air passage portion of said light transmitting panel extending beyond the periphery of said illuminating means.

2. A ceiling structure according to claim 1 wherein said light transmitting panel has a peripheral flange, said unit comprises a plurality of flexible brackets engaging said peripheral flange on said light producing panel for removably supporting said light producing panel, and said passageway portion of said light transmitting panel has a plurality of rectangular passages of equal size, and including means for pivotally supporting said light transmitting panel for swinging movement to afford access to the interior of said housing through said ceiling panel means.

3. In a ceiling structure for a telephone booth, the combination comprising a housing adapted to be mounted on the top of the telephone booth, said housing including a horizontally extending panel means having a light transmitting panel and adapted to provide a ceiling for the telephone booth, said light transmitting panel having a portion providing passageways for the flow of air through said ceiling panel means, and upright side walls extending about the periphery of the ceiling panel means for supporting the same, illuminating means including a light producing panel providing a planar source of light, air circulating means, means securing said illuminating means and said air circulating means together to form an illumination and ventilating unit with said air circulating means positioned beneath said illuminating means and immedately above said ceiling panel means and mounting said unit on said upright side walls at a location substantially centrally of the telephone booth above said ceiling panel means with said light producing panel extending horizontally, said light transmitting panel being located in alignment with said unit, said unit including a bracket for supporting said air circulating means, and hinge means connected to said bracket and operable for swinging said bracket and said air circulating means downwardly to afford access to said illuminating means from the bottom of said unit."

4. A ceiling structure according to claim 3 wherein said light transmitting panel has a peripheral flange, said unit comprises a plurality of flexible brackets engaging said peripheral flange on said light producing panel for removably supporting said light producing panel, and said passageway portion of said light transmitting panel has a plurality of rectangular passages of equal size, and including means for pivotally supporting said light transmitting panel for swinging movement to afford access to the interior of said housing through said ceiling panel means.

References Cited in the file of this patent

UNITED STATES PATENTS

| | | |
|---|---|---|
| 2,743,388 | Bartley | Apr. 24, 1956 |
| 2,887,856 | Wile | May 26, 1956 |
| 2,925,770 | Sherron | Feb. 23, 1960 |
| 2,982,196 | Sherron | May 2, 1961 |